United States Patent

Targett

Patent Number: 5,913,692
Date of Patent: Jun. 22, 1999

[54] ELECTRICAL CORD LOCKING ASSEMBLY

[76] Inventor: John N. Targett, 222 Dill Hall Lane Church, Accrington Lancashire BB5 4DG, United Kingdom

[21] Appl. No.: 09/018,978
[22] Filed: Feb. 5, 1998
[51] Int. Cl.⁶ .................................................. H01R 13/62
[52] U.S. Cl. .......................... 439/369; 439/367; 439/371
[58] Field of Search .................................. 439/369, 370, 439/371, 372, 456, 457, 458, 367

[56] References Cited

U.S. PATENT DOCUMENTS

| | | | |
|---|---|---|---|
| 4,143,934 | 3/1979 | Siebert | 439/369 |
| 4,643,505 | 2/1987 | House et al. | 439/369 |
| 5,217,387 | 6/1993 | Hull et al. | 439/367 |

*Primary Examiner*—Steven L. Stephan
*Assistant Examiner*—Hal Moon Hyeon

[57] ABSTRACT

An electric power cable locking device is provided including a first electrical cord having a male plug. Associated therewith is a second electrical cord having a female plug. A housing has a top half and a bottom half which are hingably coupled and have a locking mechanism for selectively precluding access to an interior space of the housing. The plugs of the first and second electrical cord are interconnected within the interior space of the housing. At least one teeth assembly is formed of a pair of plates coupled at bottom edges thereof to an inner surface of one of the halves of the housing with a generally a V-shaped vertical cross-section. An interior surface of the plates has a plurality of teeth formed therein. At least one teeth assembly engagement mechanism includes a pair of strips each having a bottom edge mounted to an inner surface of the other half of the housing with the strips extending away from each other. Upon the closing of the housing, an interior surface of the strips of the teeth assembly engagement mechanism engage a top edge of the plates of the teeth assembly thereby urging the same toward each other. During use, at least one of the cords is situated between the interior surfaces of the plates of the teeth assembly and is fixed therebetween when the housing is closed.

8 Claims, 3 Drawing Sheets

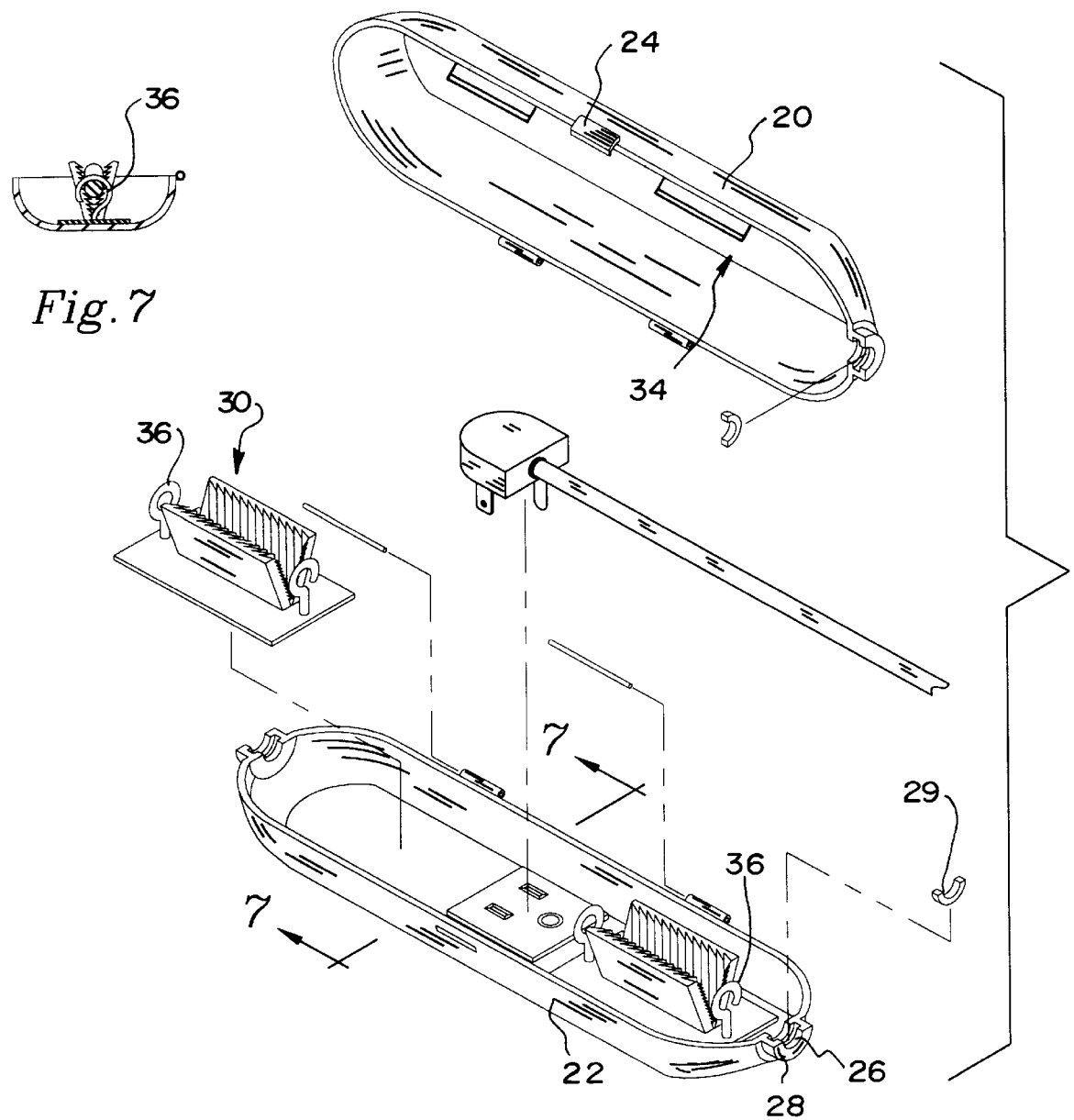

ELECTRICAL CORD LOCKING ASSEMBLY

BACKGROUND OF THE INVENTION

1. Field of the Invention

The present invention relates to electrical plug couples and more particularly pertains to a new electrical cord locking assembly for preventing the theft of an appliance which is connected to a power source via a live power cord.

2. Description of the Prior Art

The use of electrical plug couples is known in the prior art. More specifically, electrical plug couples heretofore devised and utilized are known to consist basically of familiar, expected and obvious structural configurations, notwithstanding the myriad of designs encompassed by the crowded prior art which have been developed for the fulfillment of countless objectives and requirements.

Known prior art electrical plug couples include U.S. Pat. No. 5,129,839; U.S. Pat. No. 5,259,782; U.S. Pat. No. 5,135,409; U.S. Pat. No. 5,443,397; U.S. Pat. No. 5,336,107; and U.S. Pat. No. Des. 340,695.

In these respects, the electrical cord locking assembly according to the present invention substantially departs from the conventional concepts and designs of the prior art, and in so doing provides an apparatus primarily developed for the purpose of preventing the theft of an appliance which is connected to a power source via a live power cord.

SUMMARY OF THE INVENTION

In view of the foregoing disadvantages inherent in the known types of electrical plug couples now present in the prior art, the present invention provides a new electrical cord locking assembly construction wherein the same can be utilized for preventing the theft of an appliance which is connected to a power source via a live power cord.

The general purpose of the present invention, which will be described subsequently in greater detail, is to provide a new electrical cord locking assembly apparatus and method which has many of the advantages of the electrical plug couples mentioned heretofore and many novel features that result in a new electrical cord locking assembly which is not anticipated, rendered obvious, suggested, or even implied by any of the prior art electrical plug couples, either alone or in any combination thereof.

To attain this, the present invention generally comprises a first electrical cord having a male plug with a rectangular configuration. The male plug is defined by a top face, a bottom face, and a periphery formed therebetween. As shown in FIG. 6, the bottom face has a plurality of contact prongs coupled thereto and extended downwardly therefrom. Associated therewith is a second electrical cord having a female plug with a rectangular configuration defined by a top face, a bottom face, and a periphery formed therebetween. The top face of the female plug has a plurality of contact apertures formed therein. Next provided is a housing having a central portion with a generally cylindrical configuration and a pair of integrally formed ends each defining a hollow hemisphere. As shown in FIGS. 4 & 5, the housing is divided along a horizontal plane to define a top half and a bottom half which are hingably coupled along an axis which remains in parallel with a central axis of the housing. Mounted on a side of the housing opposite the hingable coupling is a locking mechanism for selectively precluding access to an interior space of the housing. Each half of the housing further has a semicircular cut out formed at an end thereof. As such, when the housing is closed, the semicircular cut outs define a pair of axially aligned circular apertures. In use, the plugs of the first and second electrical cord are interconnected at a central extent of the interior space of the housing with the cords being situated within a corresponding one of the circular apertures of the housing. Further included is a pair of teeth assemblies each formed of a pair of planar rectangular plates. Such plates are coupled together at bottom edges thereof to an inner surface of the bottom half of the housing. The plates extend upwardly from the bottom half of the housing such that each teeth assembly has a V-shaped vertical cross-section along an entire length thereof. An interior surface of the plates have a plurality of triangular cut outs formed therein to define teeth. The teeth assemblies are each mounted to the bottom half of the housing adjacent to a respective one of the circular apertures thereof. As such, the bottom edges of each plate is in alignment with a line connecting the circular apertures of the housing. Working in conjunction with the teeth assemblies is a pair of teeth assembly engagement mechanisms. Each of such mechanisms include a pair of planar rectangular strips each having a bottom edge mounted to an inner surface of the top half of the housing in spaced parallel relationship. The strips extend downwardly and away from each other. Upon the closing of the housing, an interior surface of the strips of each teeth assembly engagement mechanism engage a top edge of each of the plates of an associated one of the teeth assemblies. Thus, the plates are urged toward each other. By this feature, the cords are each situated between the interior surfaces of the plates of the respective teeth assemblies and are fixed therebetween when the housing is closed. Finally, a plurality of hooks are provided each having a lower linear extent and an upper loop extent coupled to the lower linear extent. The upper loop extent is equipped with an opening adjacent a bottom thereof. The lower linear extents of the hooks are mounted to the inner surface of the lower half of the housing adjacent to ends of the teeth assemblies. When mounted, the upper loop extents remain in general coaxial alignment with the circular apertures of the housing. As such, the cords are adapted to be strung through the upper loop extents of the hooks during use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electrical cord locking assembly apparatus and method which has many of the advantages of the electrical plug couples mentioned heretofore and many novel features that result in a new electrical cord locking assembly which is not anticipated, rendered obvious, suggested, or even implied by any of the prior art electrical plug couples, either alone or in any combination thereof.

It is another object of the present invention to provide a new electrical cord locking assembly which may be easily and efficiently manufactured and marketed.

It is a further object of the present invention to provide a new electrical cord locking assembly which is of a durable and reliable construction.

An even further object of the present invention is to provide a new electrical cord locking assembly which is susceptible of a low cost of manufacture with regard to both materials and labor, and which accordingly is then susceptible of low prices of sale to the consuming public, thereby making such electrical cord locking assembly economically available to the buying public.

Still yet another object of the present invention is to provide a new electrical cord locking assembly which provides in the apparatuses and methods of the prior art some of the advantages thereof, while simultaneously overcoming some of the disadvantages normally associated therewith.

Still another object of the present invention is to provide a new electrical cord locking assembly for preventing the theft of an appliance which is connected to a power source via a live power cord.

Even still another object of the present invention is to provide a new electrical cord locking assembly that includes a first electrical cord having a male plug. Associated therewith is a second electrical cord having a female plug. A housing has a top half and a bottom half which are hingably coupled and have a locking mechanism for selectively precluding access to an interior space of the housing. The plugs of the first and second electrical cord are interconnected within the interior space of the housing. At least one teeth assembly is formed of a pair of plates coupled at bottom edges thereof to an inner surface of one of the halves of the housing with a generally a V-shaped vertical cross-section. An interior surface of the plates has a plurality of teeth formed therein. At least one teeth assembly engagement mechanism includes a pair of strips each having a bottom edge mounted to an inner surface of the other half of the housing with the strips extending away from each other. Upon the closing of the housing, an interior surface of the strips of the teeth assembly engagement mechanism engage a top edge of the plates of the teeth assembly thereby urging the same toward each other. During use, at least one of the cords is situated between the interior surfaces of the plates of the teeth assembly and is fixed therebetween when the housing is closed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an exploded view of the present invention.

FIG. 7 is a side cross-sectional view of the present invention taken along line 7—7 shown in FIG. 6.

DESCRIPTION OF THE PREFERRED EMBODIMENT

Figure 1:
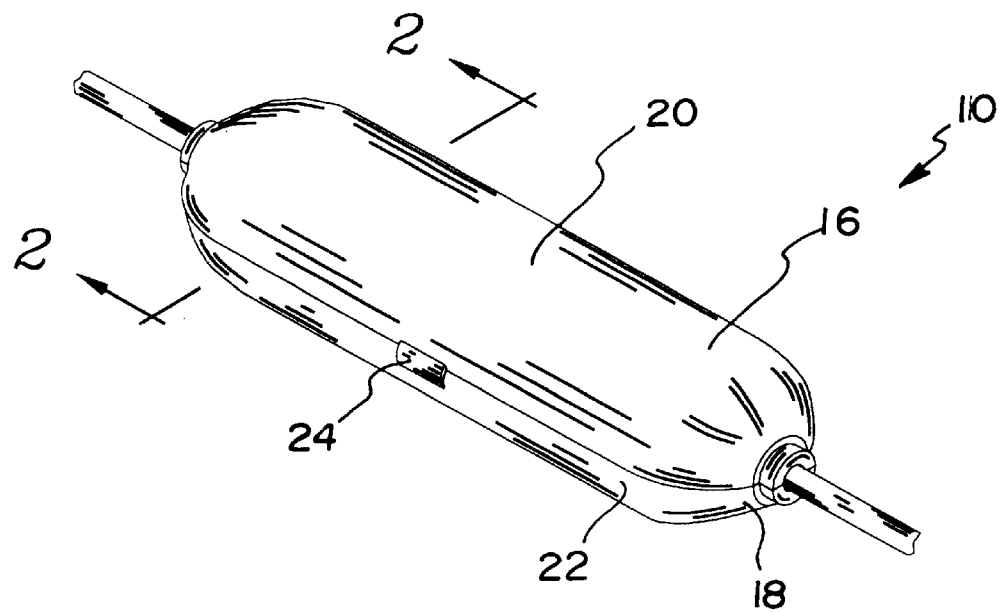
FIG. 1 is a perspective view of a new electrical cord locking assembly according to the present invention.
Figure 2:
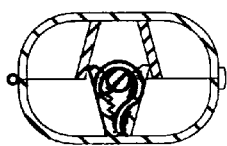
FIG. 2 is a side cross-sectional view of the present invention taken along line 2—2 shown in FIG. 1.
Figure 3:
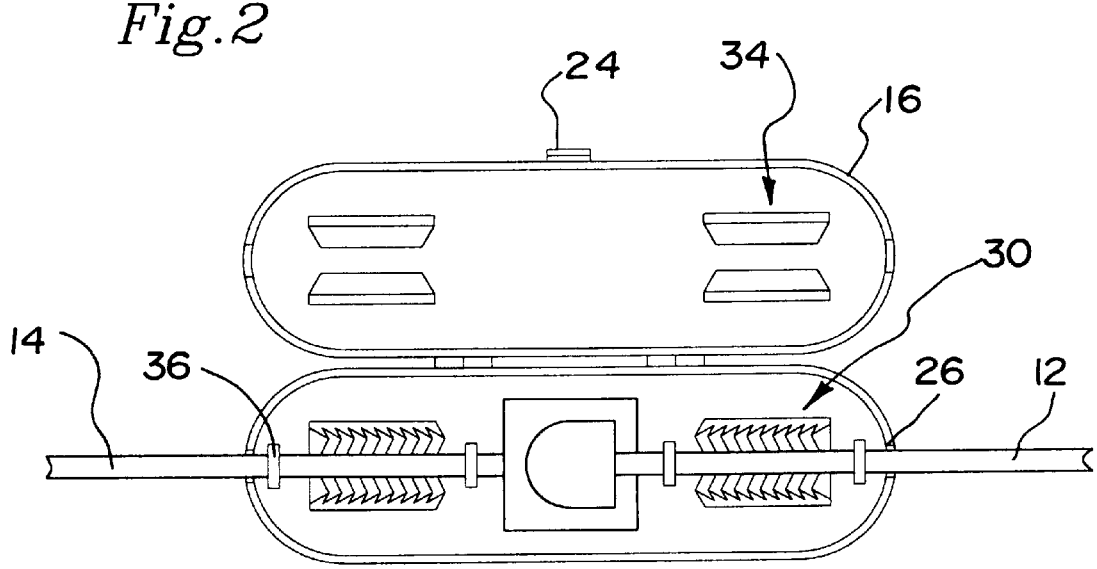
FIG. 3 is a top view of the present invention.

With reference now to the drawings, and in particular to FIGS. 1 through 7 thereof, a new electrical cord locking assembly embodying the principles and concepts of the present invention and generally designated by the reference numeral 10 will be described.

The present invention, designated as numeral 10, includes a first electrical cord 12 having a male plug with a rectangular configuration. The male plug is defined by a top face, a bottom face, and a periphery formed therebetween. As shown in FIG. 6, the bottom face has a plurality of contact prongs coupled thereto and extended downwardly therefrom. Associated therewith is a second electrical cord 14 having a female plug with a rectangular configuration defined by a top face, a bottom face, and a periphery formed therebetween. The top face of the female plug has a plurality of contact apertures formed therein. It should be understood that plugs of various other configurations may also be employed in the present invention.

Figure 4:
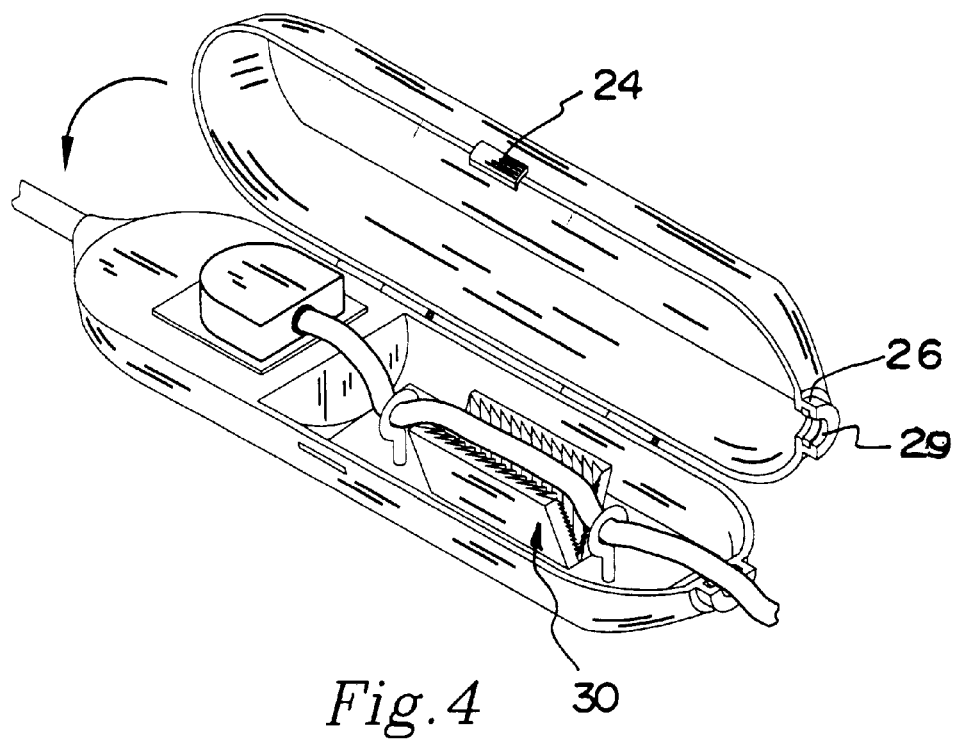
FIG. 4 is a perspective view of the housing of an alternate embodiment of the present invention.
Figure 5:
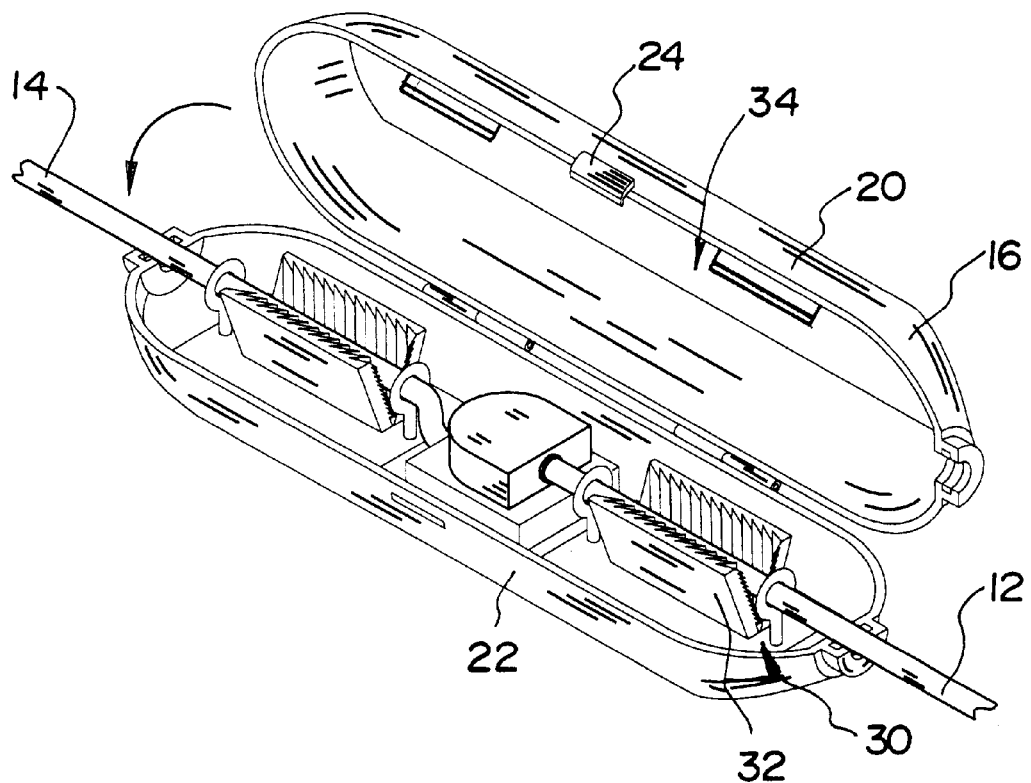
FIG. 5 is a perspective view of the housing of the present invention.

Next provided is a housing 16 having a central portion with a generally cylindrical configuration and a pair of integrally formed ends 18 each defining a hollow hemisphere. As shown in FIGS. 4 & 5, the housing is divided along a horizontal plane to define a top half 20 and a bottom half 22 which are hingably coupled along an axis which remains in parallel with a central axis of the housing. Mounted on a side of the housing opposite the hingable coupling is a locking mechanism 24 for selectively precluding access to an interior space of the housing. While a simply detent/indent combination is shown for exemplary purposes, it should be noted that a key or combination based locking mechanism is preferably employed.

Each half of the housing further has a semicircular cut out 26 formed at an end thereof. As such, when the housing is closed, the semicircular cut outs define a pair of axially aligned circular apertures. Integrally coupled to an exterior of the housing in coaxial alignment with the circular apertures are grommet halves 28 each with a tubular configuration. As an option, an interior surface of each grommet half may include a water sealing bushing 29 removably mounted therein. In use, the plugs of the first and second electrical cord are interconnected at a central extent of the interior space of the housing with the cords being situated within a corresponding one of the circular apertures of the housing. In an alternate embodiment, shown in FIG. 4, the second plug is integrally formed in the housing.

Further included is a pair of teeth assemblies 30 each formed of a pair of planar rectangular plates 32. Such plates are coupled together at bottom edges thereof to an inner surface of the bottom half of the housing. The plates extend upwardly from the bottom half of the housing such that each teeth assembly has a V-shaped vertical cross-section along an entire length thereof. For reasons that will become apparent hereinafter, a height of the plates is greater than that of the bottom half of the housing. An interior surface of the plates have a plurality of triangular cut outs formed therein to define teeth. The teeth assemblies are each mounted to the bottom half of the housing adjacent to a respective one of the circular apertures. As such, the bottom edges of each plate is in parallel with a line connecting the circular apertures of the housing. In the preferred embodiment, the teeth each define an engagement edge which extends toward the associated end of the housing. In an alternate embodiment, as shown in FIG. 6, one of the teeth assemblies is mounted on a plate which is in turn removably coupled to the bottom half of the housing.

Working in conjunction with the teeth assemblies is a pair of teeth assembly engagement mechanisms 34. Each of such mechanisms include a pair of planar rectangular strips each having a bottom edge mounted to an inner surface of the top half of the housing in spaced parallel relationship. The strips extend downwardly and away from each other. Upon the closing of the housing, an interior surface of the strips of each teeth assembly engagement mechanism engage a top edge of each of the plates of an associated one of the teeth assemblies. Thus, the plates are urged toward each other. By this feature, the cords are each situated between the interior surfaces of the plates of the respective teeth assemblies and are fixed therebetween when the housing is closed.

Finally, a plurality of hooks 36 are provided each having a lower linear extent and an upper loop extent coupled to the lower linear extent. The upper loop extent is equipped with an opening adjacent a bottom thereof. The lower linear extents of the hooks are mounted to the inner surface of the lower half of the housing adjacent to ends of the teeth assemblies. When mounted, the upper loop extents remain in general coaxial alignment with the circular apertures of the housing. As such, the cords are adapted to be strung through the upper loop extents of the hooks during use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electric power cable locking device comprising, in combination:

a first electrical cord having a male plug with a rectangular configuration defined by a top face, a bottom face, and a periphery formed therebetween, the bottom face having a plurality of contact prongs coupled thereto and extended downwardly therefrom;

a second electrical cord having a female plug with a rectangular configuration defined by a top face, a bottom face, and a periphery formed therebetween, the top face having a plurality of contact apertures formed therein;

a housing having a central portion with a generally cylindrical configuration and a pair of integrally formed ends each defining a hollow hemisphere, the housing being divided along a horizontal plane to define a top half and a bottom half which are hingably coupled along an axis which remains in parallel with a central axis of the housing and a locking mechanism mounted on a side of the housing opposite the hingable coupling for selectively precluding access to an interior space of the housing, each half of the housing further having a semicircular cut out formed at an end thereof such that when the housing is closed, the semicircular cut outs defined by a pair of axially aligned circular apertures, whereby the plugs of the first and second electrical cord are interconnected at a central extent of the interior space of the housing with the cords being situated within a corresponding one of the circular apertures of the housing;

a pair of teeth assemblies each formed of a pair of planar rectangular plates coupled together at bottom edges thereof to an inner surface of the bottom half of the housing and extending upwardly therefrom such that each teeth assembly has a V-shaped vertical cross-section along an entire length thereof, an interior surface of the plates having a plurality of triangular cut outs formed therein to define teeth, the teeth assemblies each mounted to the bottom half of the housing adjacent to a respective one of the circular apertures thereof such that the bottom edges thereof are in alignment with a line connecting the circular apertures;

a pair of teeth assembly engagement mechanisms each including a pair of planar rectangular strips each having a bottom edge mounted to an inner surface of the top half of the housing in spaced parallel relationship with the strips extending downwardly and away from each other, whereby upon the closing of the housing, an interior surface of the strips of each teeth assembly engagement mechanism engage a top edge of each of the plates of an associated one of the teeth assemblies thereby urging the same toward each other, whereby the cords are each situated between the interior surfaces of the plates of the respective teeth assemblies and are fixed therebetween when the housing is closed; and a plurality of hooks each having a lower linear extent and an upper loop extent coupled to the lower linear extent with an opening adjacent a bottom thereof, the lower linear extents of the hooks mounted to the inner surface of the lower half of the housing adjacent to ends of the teeth assemblies in general coaxial alignment with the circular apertures of the housing, whereby the cords are adapted to be strung through the upper loop extents of the hooks during use.

2. An electric power cable locking device comprising:

a first electrical cord having a male plug;

a second electrical cord having a female plug;

a housing having a top half and a bottom half which are hingably coupled and have a locking mechanism for selectively precluding access to an interior space of the housing, whereby the plugs of the first and second electrical cord are interconnected within the interior space of the housing;

at least one teeth assembly formed of a pair of plates coupled at bottom edges thereof to an inner surface of one of the halves of the housing with a generally a V-shaped vertical cross-section, an interior surface of the plates having a plurality of teeth formed therein; and at least one teeth assembly engagement mechanism including a pair of strips each having a bottom edge mounted to an inner surface of the other half of the housing with the strips extending away from each other, whereby upon the closing of the housing, an interior surface of the strips of each teeth assembly engagement mechanism engage a top edge of each of the plates of an associated teeth assembly thereby urging the same toward each other, whereby the at least one of the cords is situated between the interior surfaces of the plates of the teeth assembly and is fixed therebetween when the housing is closed.

3. An electric power cable locking device as set forth in claim 2 wherein the housing has a pair of apertures formed therein each for receiving the respective cord.

4. An electric power cable locking device as set forth in claim 3 wherein the apertures are axially aligned.

5. An electric power cable locking device as set forth in claim 3 wherein the apertures are each defined by semicircular apertures formed in each half of the housing.

6. An electric power cable locking device as set forth in claim 2 and further including a plurality of hooks, whereby the cords are adapted to be strung through the hooks during use.

7. An electric power cable locking device as set forth in claim 6 wherein the hooks are coupled to the inner surface of one of the halves of the housing adjacent to ends of the teeth assemblies in general coaxial alignment with the circular apertures of the housing.

8. An electric power cable locking device as set forth in claim 2 wherein the housing has a central portion with a generally cylindrical configuration and a pair of integrally formed ends each defining a hollow hemisphere.

* * * * *